(12) United States Patent
Olsson (10) Patent No.: US 10,262,676 B2
(45) Date of Patent: Apr. 16, 2019

(54) MULTI-MICROPHONE POP NOISE CONTROL

(71) Applicant: GN Audio A/S, Ballerup (DK)

(72) Inventor: Rasmus Kongsgaard Olsson, Ballerup (DK)

(73) Assignee: GN Audio A/S (DK)

( * ) Notice: Subject to any disclaimer, the term of this patent is extended or adjusted under 35 U.S.C. 154(b) by 0 days.

(21) Appl. No.: 16/012,263

(22) Filed: Jun. 19, 2018

(65) Prior Publication Data

US 2019/0005977 A1    Jan. 3, 2019

(30) Foreign Application Priority Data

Jun. 30, 2017  (EP) .................................... 17179056

(51) Int. Cl.

| | |
|---|---|
| *H04R 1/04* | (2006.01) |
| *H04R 1/08* | (2006.01) |
| *H04R 1/40* | (2006.01) |
| *H04R 3/00* | (2006.01) |
| *G10L 21/0232* | (2013.01) |

(52) U.S. Cl.
CPC ............ *G10L 21/0232* (2013.01); *H04R 1/04* (2013.01); *H04R 1/083* (2013.01); *H04R 1/406* (2013.01); *H04R 3/005* (2013.01); *H04R 2410/01* (2013.01); *H04R 2410/07* (2013.01)

(58) Field of Classification Search
None
See application file for complete search history.

(56) References Cited

U.S. PATENT DOCUMENTS

| 8,175,291 B2 | 5/2012 | Chan et al. |
|---|---|---|
| 8,812,309 B2 | 8/2014 | Ramakrishnan et al. |
| (Continued) | | |

FOREIGN PATENT DOCUMENTS

| EP | 1581026 | 9/2005 |
|---|---|---|
| WO | WO 2006/117032 | 11/2006 |
| (Continued) | | |

OTHER PUBLICATIONS

Extended European Search Report for European patent application No. 17179056.1 dated Dec. 21, 2017.

*Primary Examiner* — Curtis A Kuntz
*Assistant Examiner* — Kenny H Truong
(74) *Attorney, Agent, or Firm* — Altera Law Group, LLC (57) ABSTRACT

Disclosed is a method and a headset for reducing pop-noise in voice communication between a user and a far-end device. The headset has a first, a second and a third electro-acoustic input transducer for reception of audio input signals. The headset also has a first beamformer to provide a voice signal. The first beamformer is configured to optimize the voice-to-background noise ratio. The headset comprises a second beamformer configured for providing a pop-noise signal. The pop-noise signal is based on the first input signal from the first input transducer, the second input signal from the second input transducer, and a third input signal from the third input transducer. The second beamformer is adaptively configured to cancel voice and background noise while not cancelling pop-noise. The headset compares the pop-noise signal to the voice signal to determine time periods and frequency bands having pop-noise.

15 Claims, 5 Drawing Sheets

(56) References Cited

U.S. PATENT DOCUMENTS

| | | |
|---|---|---|
| 9,438,985 B2 | 9/2016 | Dusan et al. |
| 2013/0163781 A1 | 6/2013 | Thyssen et al. |
| 2014/0126743 A1 | 5/2014 | Petit et al. |
| 2015/0110284 A1 | 4/2015 | Niemisto et al. |
| 2015/0172807 A1* | 6/2015 | Olsson ................. G10K 11/175 381/74 |

FOREIGN PATENT DOCUMENTS

| | | |
|---|---|---|
| WO | WO 2008/016586 | 2/2008 |
| WO | WO 2016/147020 | 9/2016 |

* cited by examiner

MULTI-MICROPHONE POP NOISE CONTROL

PRIORITY DATA

This US patent application claims priority to European patent application no. 17179056.1 filed on Jun. 30, 2017, which is hereby incorporated by reference herein.

FIELD

The present disclosure relates to a headset for reducing pop-noise in voice communication between a user and a far-end device. The headset comprises a first, a second and a third electro-acoustic input transducer for reception of audio input signals.

BACKGROUND

To improve suppression of background noise, headsets are often equipped with gradient microphones and/or multiple with microphones with beamforming, preferably mounted near the user's mouth on a microphone arm. Unfortunately, such microphone systems are very sensitive to pop noise—as well as to wind noise and handling noise.

Pop noise may be suppressed by external windscreens, made e.g. of foam, and/or by moving the microphone away from the mouth. Effective windscreens are generally large and bulky, and moving the microphone reduces the voice-to-background-noise ratio—in particular at lower frequencies. During phone calls, pop noise may stress the far-end participant considerably.

SUMMARY

There is a need for an improved suppression of pop noise in a headset microphone.

Disclosed is a headset for reducing pop-noise in voice communication between a user and a far-end device. The headset is configured to be worn by the user. The headset comprises a microphone boom having a first end and a second end. The first end is configured to point towards the mouth of the user, when the user is wearing the headset. The headset comprises a first, a second and a third electro-acoustic input transducer for reception of audio input signals. The first, second and third electro-acoustic input transducer are provided in the microphone boom. The headset comprises a first beamformer configured for providing a voice signal. The voice signal is based on a first input signal from the first input transducer. The first beamformer is configured to optimize the voice-to-background noise ratio. The headset comprises a second beamformer configured for providing a pop-noise signal. The pop-noise signal is based on the first input signal from the first input transducer, the second input signal from the second input transducer, and a third input signal from the third input transducer. The second beamformer is adaptively configured to cancel voice and background noise while not cancelling pop-noise. The headset comprises a comparator configured to repeatedly compare the pop-noise signal to the voice signal within each of multiple frequency bands to determine time periods and frequency bands having pop-noise. In the determined time periods and frequency bands having pop-noise, the pop-noise, in an output signal configured to be transmitted to the far-end device, is reduced.

Also disclosed is a method in a headset for reducing pop-noise in voice communication between a user wearing the headset and a far-end device. The headset comprises a microphone boom having a first end and a second end, where the first end is configured to point towards the mouth of the user, when the user is wearing the headset. The headset comprises a first, a second and a third electro-acoustic input transducer for reception of audio signals, where the first, second and third electro-acoustic input transducer are provided in the microphone boom. The method comprises receiving a first audio signal in the first electro-acoustic input transducer, a second audio signal in the second electro-acoustic input transducer and a third audio signal in the third electro-acoustic input transducer. The method comprises providing a voice signal in a first beamformer, the voice signal is based on the first input signal from the first input transducer, where the first beamformer is configured to optimize the voice-to-background noise ratio. The method comprises providing a pop-noise signal in a second beamformer, the pop-noise signal is based on the first input signal from the first input transducer, the second input signal from the second input transducer and the third input signal from the third input transducer, where the second beamformer is adaptively configured to cancel voice and background noise while not cancelling pop-noise. The method comprises repeatedly comparing, in a comparator, the pop-noise signal to the voice signal within each of multiple frequency bands to determine time periods and frequency bands having pop-noise. The method comprises reducing the pop-noise in an output signal configured to be transmitted to the far-end device in the determined time periods and frequency bands having pop-noise.

It is an advantage that pop-noise in the output signal is reduced, as this provides a better and more pleasant transmission of the user's speech to the far end device.

Pop noise is strongest and thus worst close to the mouth of the person speaking, i.e. user of the headset in this case. Pop noise is weaker further away from the mouth of the user. Therefore it is an advantage that in the time periods and frequency bands where pop-noise is present in the user speech, this pop noise can be reduced. Reducing the pop noise can be performed in different ways.

As the pop noise is worst closest to the user's mouth, the input signals from the input transducers, e.g. front microphone(s), on the microphone boom closest to the user's mouth may for example be replaced with the input signals from the input transducers, e.g. rear microphones, further away on the microphone boom from the user's mouth.

Pop-noise may be defined as wind turbulence caused by airflow from at least the mouth of the user wearing the headset. Pop noise, also called puff noise, is wind turbulence caused by airflow from mouth of the user speaking in a microphone or input transducer, e.g. a microphone of a headset worn by the user. It is assumed in the following that breath noise which originates from the mouth but also the noise is treated by the methods intended for pop noise described herein. The pop noise wind turbulence inflicts movements of the microphone membrane of the microphone of the headset. Pop noise may be caused by plosives, which are oral-stop consonants such as p, t and k, generated by talkers, singers and other vocalists speaking in a microphone. In communication using e.g. a communication headset, pop noise can lead to a very stressful experience to the far-end side of the conversation.

A model of pop noise involves human language, speech production, fluid mechanics, and/or electro-acoustics. Some characteristics of pop noise exist, which can be exploited:

Pop noise depends strongly on distance to jet from mouth. Hence microphones that are further away from the mouth are less exposed.

Pop noise exhibits very low correlation between microphones (incoherency).

Pop noise is time-varying, and much of the time, there is no pop noise.

Pop noise has a time-varying tilted power spectrum, dominated by low frequencies.

Thus pop noise is strongest and thus worst close to the mouth of the person speaking, i.e. user of the headset in this case. Pop noise is weak further away from the mouth of the user. Pop noise is a low-frequency noise.

The headset and the method as disclosed provides that pop noise is removed from the output signal while performing optimal background noise cancellation and preserving full voice quality.

The headset comprises a first, a second and a third electro-acoustic input transducer, e.g. three microphones. The electro-acoustic input transducers are mounted on a microphone boom. Preferably the electro-acoustic input transducers are arranged in an end-fire configuration on the microphone boom.

A voice signal is be provided by the first beamformer. The voice signal is based on at least the first input signal from the first input transducer. The first input transducer may be the input transducer which is closest to the user's mouth on the microphone boom, when the microphone boom is arranged in its intended position relative to the user's mouth. The first beamformer is configured to optimize the voice-to-background noise ratio. The voice signal may be based also on the second input signal from the second input transducer. The first input transducer and the second input transducer may be the two input transducers which are closest to the user's mouth on the microphone boom, when the microphone boom is arranged in its intended position relative to the user's mouth. The third input transducer may be the rearmost or far input transducer relative to the user's mouth, when the microphone boom is arranged in its intended position relative to the user's mouth.

The pop-noise signal is be provided by the second beamformer based on signals from all three input transducers. The second beamformer is adaptively configured to cancel voice and background noise while not cancelling pop noise.

The comparator is configured to repeatedly compare the pop noise signal to the voice signal within each of multiple frequency bands to determine time periods and frequency bands, e.g. time-frequency cells, which have high content of pop noise. The comparator may be or may comprise a pop noise detector or pop noise sensor.

In the determined time periods and frequency bands having pop-noise, the pop-noise, in an output signal configured to be transmitted to the far-end device, is reduced.

Reducing the pop-noise in the output signal may comprise replacing the pop-noise with another signal, and/or suppressing the pop-noise with another signal, and/or removing the pop-noise. For example the pop-noise may be replaced with the third input signal from the third input transducer, since this third input signal comprise less pop-noise A mixer may replace the voice signal with the signal from the third input transducer, e.g. the rearmost microphone, in time-frequency cells having high content of pop noise. The resulting signal or output signal is provided to the communication system, such that the far-end device receives the user's voice with reduced pop-noise.

The headset may comprise more than three input transducers, such as comprise four, five, six etc. input transducers. Accordingly the first beamformer may process more than one or two input signals from input transducers.

The mixer may replace the voice signal with a comfort noise or with silence in the time-frequency cells having very high content of pop noise. The mixer may suppress the voice signal in the time-frequency cells having very high content of pop noise.

If there are two front input transducers, then the voice signal or a primary signal is formed by beamforming one or both of the two front input transducers. Optionally more input transducers may be included in the primary signal beamformer. This beamformer is configured to optimize the voice-to-background noise ratio.

A pop-noise sensor, which may be a beamformer or a virtual microphone, may be formed by using three or more input transducers. This beamformer is adaptively configured to cancel voice and background noise while not cancelling pop noise. Finally the pop noise sensor may be compared with one or more if the front input transducers to determine time-frequency cells that have high content of pop noise.

In a mixing process, the parts of the voice signal or primary signal that contains pop noise may be replaced with the input signal from the rear or third input transducer microphone, and/or with a comfort noise or silence in severe cases.

The headset comprises a microphone boom having a first end and a second end. The first end is configured to point towards the mouth of the user, when the user is wearing the headset. The second end of the microphone boom is configured to be mounted at the headset, e.g. at an output transducer, at an earphone housing or speaker housing of the headset, at the ear of the user etc.

The headset comprises a first, a second and a third electro-acoustic input transducer for reception of audio signals. The audio signals are input signal. Thus the first input transducer is configured to receive a first input signal. The second input transducer is configured to receive a second input signal. The third input transducer is configured to receive a third input signal.

The headset comprises a first beamformer configured for providing a voice signal. The voice signal is based on a first input signal from the first input transducer. The first input signal from the first input transducer may be provided to a processing unit for generating a voice signal. Thus the processing unit may comprise the first beamformer. The first input transducer may be a gradient microphone, a noise cancelling microphone etc.

The first beamformer may be adaptive, e.g. the first beamformer may be configured to cancel audio input from different audio sources.

Speech parts and noise parts of the input signals may be correlated. Pop noise parts in the input signals may be uncorrelated.

The first beamformer is configured to optimize the voice-to-background noise ratio and/or to suppress the noise compared to the voice.

The headset comprises a comparator configured to repeatedly compare the pop-noise signal to the voice signal within each of multiple frequency bands to determine time periods and frequency bands having pop-noise. These time periods and frequency bands may be termed time-frequency cells. Time periods and frequency bands having pop-noise may be time periods and frequency bands having high content of pop noise.

The directional characteristics of the input transducers can be controlled, adapted or configured such that the input signals from two of the input transducers, e.g. the two front microphones, can be substantially similar and thereby the speech and/or noise from these input signals can be cancelled. By using three input transducers, both speech and noise can be cancelled.

When using beamformers or directional microphones, pop noise will be present. It is an advantage that by the present headset and method, pop noise can be detected and reduced.

In some embodiments pop-noise is wind turbulence caused by airflow from at least the mouth of the user wearing the headset.

In some embodiments the first input transducer and the second input transducer are arranged on the microphone boom with a shorter distance from the first end than the distance between the first end and the third input transducer. Thus the first and the second input transducer may be arranged in the first end of the microphone boom which is configured to be arranged close, proximate, adjacent to the mouth of the user, when the user wears the headset in its intended position. The first and the second input transducer may be front microphones or input transducers. The third input transducer may be a rear microphone or input transducer. The third input transducer may be arranged on the microphone boom in further away from the first end, such as closer to the second end. There may for example 0.5 cm from the first end to the first and the second input transducer. There may for example 2 cm from the first end to the third input transducer. Thus the third input transducer is arranged on the microphone boom with a larger distance from the first end than the distance between the first end and the first input transducer and the second input transducer, respectively.

In some embodiments reducing the pop-noise in the output signal comprises replacing the voice signal with the third input signal from the third input transducer in time periods and frequency bands having pop-noise. This may be obtained by providing a mixer in the headset, where the mixer is configured for performing the reduction, the replacement etc. A replacement beamformer may be used for performing this. The replacement beamformer may be a beamformer consisting of input transducers where no pop or no pop-noise is detected, e.g. the third input transducer and a fourth input transducer, or e.g. the third input transducer and the second input transducer.

In some embodiments reducing the pop-noise in the output signal comprises mixing the voice signal, in time periods and frequency bands having pop-noise, with a comfort signal and/or with the third input signal.

In some embodiments reducing the pop-noise in the output signal comprises suppressing, such as removing the voice signal in time periods and frequency bands having pop-noise. Hereby for example silence may be provided instead of the pop-noise. The pop-noise may be suppressed by providing another signal instead of the pop-noise.

In some embodiments the first beamformer is adapted to optimize the voice-to-background noise ratio by using a Minimum Variance Distortionless Response (MVDR) computation or a Generalised Sidelobe Canceller (GSC) computation.

The first beamformer may use other similar methods, for example blind source separation etc. The first beamformer may be an adaptive beamformer. The first beamformer may be a predefined beamformer with a specific sensitivity.

Generalized sidelobe cancelling, see e.g. Ivan Tashev; Sound Capture and Processing: Practical Approaches, pp. 388, Wiley, July 2009, refers to a beamformer which has a constraint built into the processing structure to conserve a signal of interest, which is the user speech in the headset use case.

The GSC may have two computation branches:

The first branch may be a reference branch or fixed beamformer, which picks up a mixture of user speech and ambient noise. Examples of reference branches are delay-and-sum beamformers, e.g., summing amplitude and phase signals aligned with respect to the user speech, or one of the microphones taken as a reference. The reference branch may preferably be selected and/or designed to be as insensitive as possible to the positioning of the microphones relative to the user's mouth, since the user speech response of the reference branch determines the user speech response of the GSC, as explained below. An omni-directional microphone may be suitable due to the fact that it is relatively insensitive, relatively speaking, to position and also to microphone sensitivity variation. In a multi-microphone headset microphone boom design, the rear microphone which may be situated nearer to the rotating point of the microphone boom, where the rotating point is typically at or hinged at the earphone of the headset at the user's ear, may be preferable since it is less sensitive to movements of the microphone boom. Thus, preferably this provides no change of the amplitude spectrum of the user speech signal.

The second branch of the GSC computation may compute a speech cancelled signal, where the signals are filtered and subtracted, by means of a blocking matrix, in order to reduce the user speech signal as much as possible.

Finally, noise cancelling may be performed by the GSC by adaptively filtering the speech cancelled signal(s) and subtracting it from the reference branch in order to minimize the output power. In the ideal case, the speech cancelled signal (ideally) contains no user speech component and hence the subtraction to produce the noise cancelled output does not alter the user speech component present in the reference branch. As a result, the amplitude spectrum of the speech component may be identical or very similar at the GSC reference branch and the output of the GSC beamformer. It may be said that the GSC beamformer's beam is centered on the user speech.

Thus a generalised sidelobe canceller (GSC) system or computation may be used in the method as well as other systems, such as a Minimum Variance Distortionless Response (MVDR) computation or system.

Minimum variance distortionless response (MVDR) refers to a beamformer which minimizes the output power of the filter-and-sum beamformer subject to a single linear constraint. The solution may be obtained through a one-step, closed-form solution. Often, the constraint or the steering vector is selected so that the beamformer maintains a uniform response in a look direction, i.e. the beam points in a direction of interest. The steering vector may be designed so that the amplitude spectrum of the user voice or speech component is identical at the input, i.e. the reference, and outputs of the MVDR beamformer.

The MVDR beamformer computations are briefly summarized below for a single frequency band. The signal model, i'th input, $$x_i = c_i s + n_i$$

where s and $n_i$ are the user speech and i'th ambient noise signals, respectively. $c_i$ is the complete i'th complex response incorporating the microphone amplitude and phase responses, input electronic responses and acoustic path responses.

The filter-and-sum beamformer may be written, $$y=w^H x$$

The MVDR beamformer minimizes the output subject to a normalization constraint, $$w_{MVDR}=\operatorname{argmin}_w \langle |y|^2 \rangle$$

subject to $w^H a = q$

The closed form solution to the MVDR cost function is, $$w_{MVDR} = \frac{C^{-1}a}{a^H C^{-1} a},$$

where C and a are the noise covariance matrix and the steering vector, respectively.

The steering vector a, and q=1, is selected in order to constrain the beamformer's voice or speech response to be equal to a 'best' reference microphone. Selecting the most advantageous microphone in the interest of being robust to microphone boom positioning is described above for the GSC beamformer.

Constraining the beamformer's voice or speech response to be equal to the reference, i.e. 'best', microphone may be achieved by using the relative mouth-to-mic transfer functions as steering vector $$a_i = \frac{c_i}{c_{ref}},$$

where the fraction $a_i$ may be approximated without having access to the $c_i$ by estimating the complex transfer function from the i'th microphone to the reference microphone of the user speech component.

As a result, the user speech component may be identical or similar in the reference microphone and at the output of the MVDR beamformer. This is proved below:

$$y = w^H x_{voice} = \sum_{i=1}^{M} w_i^* c_i s = c_{ref} \sum_{i=1}^{M} w_i^* \frac{c_i}{c_{ref}} s = c_{ref} \cdot 1 \cdot s$$

Further in analogy to the GSC system, the noise covariance matrix may be estimated and updated when a voice activity detector (VAD) indicates that the user speech component will not contaminate the estimate too much.

The steering vector, the noise covariance estimated and the MVDR solution may be updated at suitable intervals, for example each 4, 10 or 100 ms, balancing computational costs with noise cancelling benefits. A regularization term may be added to the noise covariance estimate.

In some embodiments the second beamformer adaptively cancels voice and background noise while not cancelling pop-noise by cancelling the parts of the input signals which are correlated between input transducers/microphone and keeping the parts of the input signals which are uncorrelated. Pop-noise may be uncorrelated between input transducers. Speech and ambient noise may be correlated between input transducers.

In some embodiments the first input transducer and the second input transducer are arranged to provide that the first input signal and the second input signal are more correlated than each of the first input signal and second input signal are correlated to the third input signal. The speech and noise parts of the input signals may be correlated between input transducers. The pop or pop-noise parts of the input signal may be uncorrelated between input transducers. The first input signal and the second input signal being more correlated may mean that these are correlated to a higher degree.

In some embodiments the headset comprises a fourth input transducer. In some embodiments the headset comprises a fifth, a sixth, as seventh, an eight etc. input transducer, on the microphone boom. More input transducers will improve the pop-noise reduction.

In some embodiments the voice signal provided by the first beamformer is further based on the second input signal from the second input transducer, and/or the third input signal from the third input transducer and/or the fourth input signal from the fourth input transducer. The pop-noise signal provided by the second beamformer may also be based on the fourth input signal from the fourth input transducer.

In some embodiments the headset comprises an output transducer for reproduction of audio signals. In some embodiment the output signal is transmitted to the output transducer thereby applying the reduced pop noise output signal to the user of the headset. The output transducer may be a speaker, a receiver etc. Transmitting the pop-noise reduced output signal to the output transducer of the headset provides that the user of the headset can hear the same output signal as is being outputted to the far-end device. This is called sidetone. It is an advantage that user can hear the same signal that is transmitted to the far-end device, such that user places the microphone boom correctly.

Sidetone is a term used in telecommunication describing the own voice feedback which is given to, e.g. a headset user. In order to achieve this effect, the headset microphone signal is added to the loudspeaker signal. This helps the headset user to control the level and character of his/her voice.

In a situation where a pop noise control system is being applied to the transmitted audio, it is useful that pop noise control is also applied to the sidetone, reflecting the reduced level of pop noise experienced by the far side of the conversation. Otherwise, the user would hear his/her own voice pop noise and adjust the microphone boom further away from the mouth. This would lead to a poorer voice-to-background noise ratio in the transmitted signal and thus counteract the idea behind applying pop noise control to the transmitted signal.

Thus, pop noise control, e.g. low-latency pop-noise, may be applied to the sidetone.

The sidetone production may be low latency, e.g. less than 10 ms, in order to be perceived naturally. On the contrary, the latency requirement on the transmitted signal is not similarly strict, e.g. a typical mobile conversation has 250 ms end-to-end latency. Therefore, a low latency version of the pop noise control is preferable, trading sound quality for low latency.

Low latency pop noise control for the sidetone can, for example, be achieved by applying the switching signal from the transmitted pop noise control to the sidetone signal, but without compensating for the detection look-ahead. The switching would then be a little 'late' all the time.

In some embodiments the first, second and third electro-acoustic input transducer are provided in the microphone boom in an end-fire configuration. An end-fire configuration may comprise that two of input transducers are arranged closer to the first end of the microphone boom, and that one or more input transducers are arranged further away from the first end of the microphone boom.

In some embodiments the microphone boom is longer than 5 cm, such as longer than 6 cm, such as longer than 7 cm, such as longer than 8 cm, such as longer than 10 cm, such as longer than 12 cm, such as longer than 14 cm. It is an advantage that the microphone boom is long, since then the first and second input transducer, e.g. front microphones, can be close to the mouth, and the third input transducer, e.g. rear microphone, can be further away from the mouth, as this achieves the effect of reducing pop noise.

The present invention relates to different aspects including the headset described above and in the following, and corresponding system parts, methods, devices, systems, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 1:
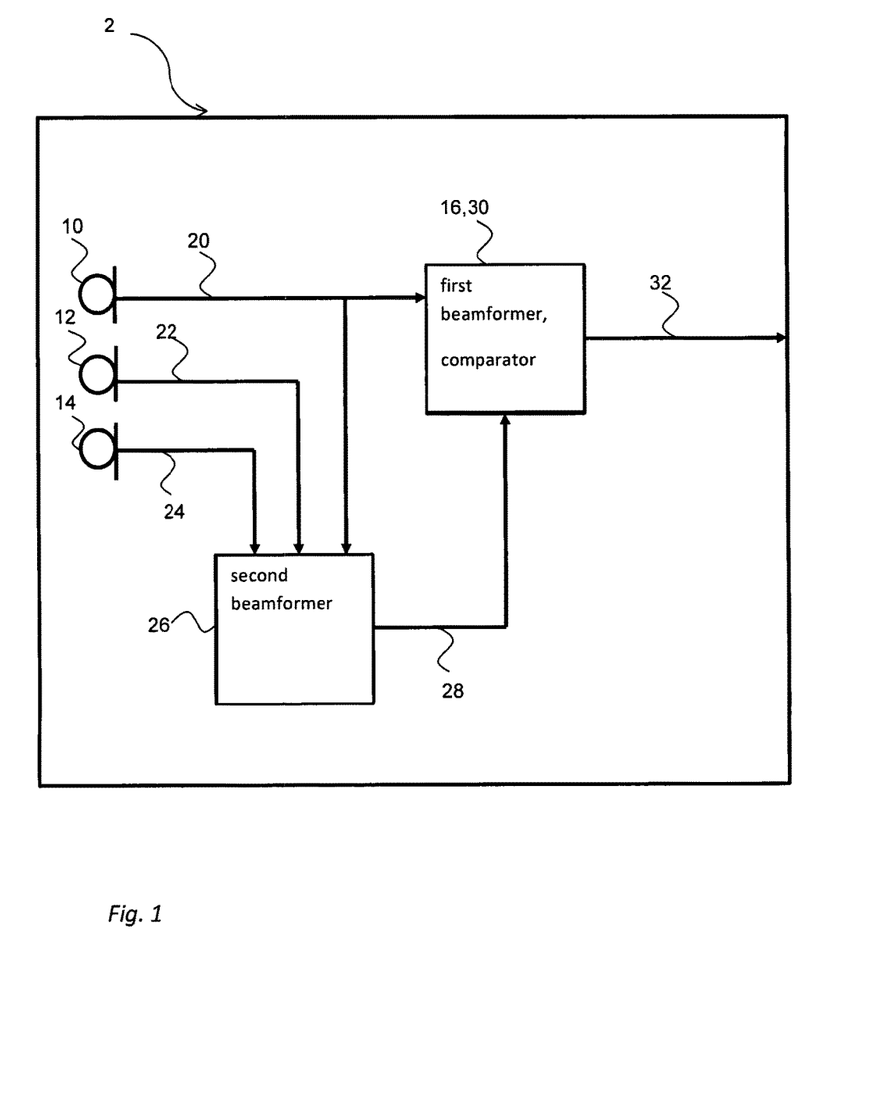
FIG. 1 schematically illustrates an example of a headset for reducing pop-noise in voice communication between a user and a far-end device.

FIG. 1 schematically illustrates an example of a headset 2 for reducing pop-noise in voice communication between a user and a far-end device. The headset 2 is configured to be worn by the user. The headset 2 comprises a microphone boom (not shown) having a first end and a second end. The first end is configured to point towards the mouth of the user, when the user is wearing the headset.

The headset 2 comprises a first electro-acoustic input transducer 10, a second electro-acoustic input transducer 12 and a third electro-acoustic input transducer 14 for reception of audio input signals.

The first 10, second 12 and third 14 electro-acoustic input transducer are provided in the microphone boom.

The headset 2 comprises a first beamformer 16 configured for providing a voice signal (not shown). The voice signal is based on a first input signal 20 from the first input transducer 10.

The first beamformer 16 is configured to optimize the voice-to-background noise ratio.

The headset 2 comprises a second beamformer 26 configured for providing a pop-noise signal 28. The pop-noise signal 28 is based on the first input signal 20 from the first input transducer 10, the second input signal 22 from the second input transducer 12, and a third input signal 24 from the third input transducer 14. The second beamformer 26 is adaptively configured to cancel voice and background noise while not cancelling pop-noise.

The headset 2 comprises a comparator 30 configured to repeatedly compare the pop-noise signal 28 to the voice signal within each of multiple frequency bands to determine time periods and frequency bands having pop-noise. In the determined time periods and frequency bands having pop-noise, the pop-noise, in an output signal 32 configured to be transmitted to the far-end device, is reduced.

Figure 2:
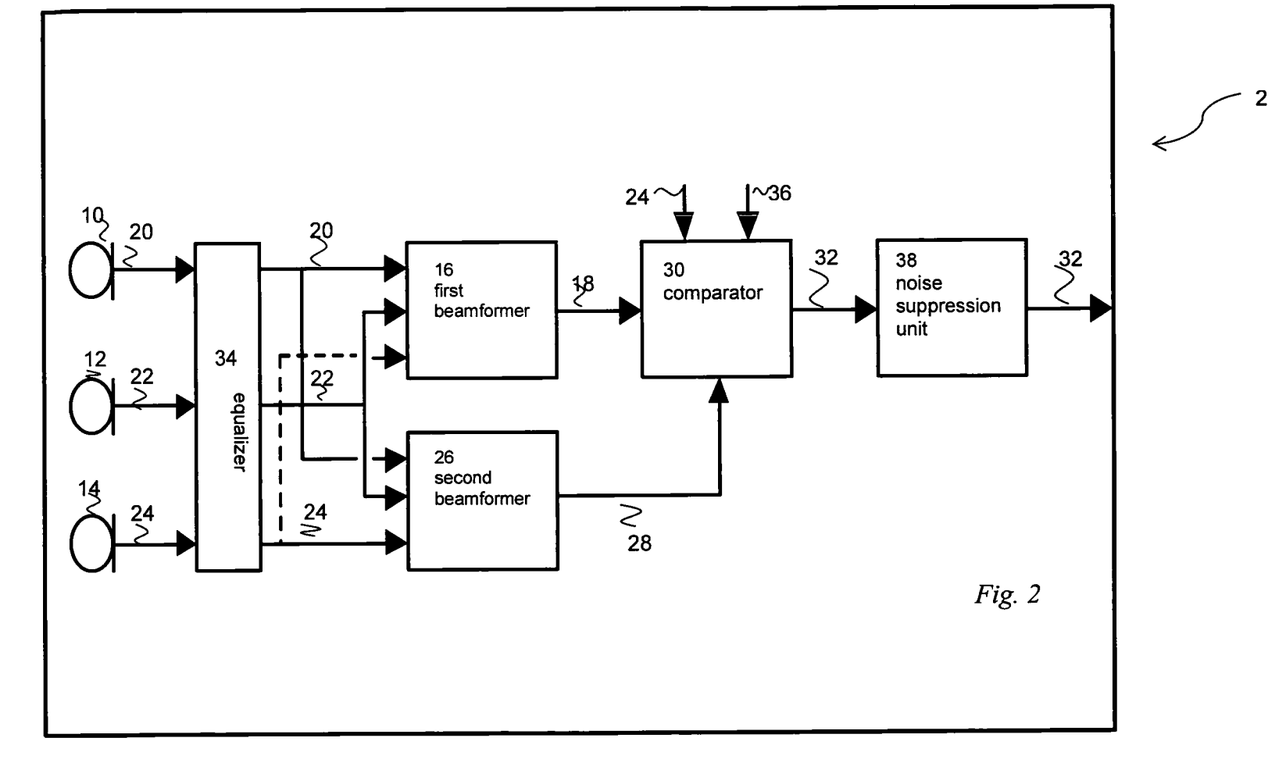
FIG. 2 schematically illustrates an example of a headset for reducing pop-noise in voice communication between a user and a far-end device.

FIG. 2 schematically illustrates an example of a headset 2 for reducing pop-noise in voice communication between a user and a far-end device. The headset 2 is configured to be worn by the user. The headset 2 comprises a microphone boom (not shown) having a first end and a second end. The first end is configured to point towards the mouth of the user, when the user is wearing the headset.

The headset 2 comprises a first electro-acoustic input transducer 10, a second electro-acoustic input transducer 12 and a third electro-acoustic input transducer 14 for reception of audio input signals.

The first 10, second 12 and third 14 electro-acoustic input transducer are provided in the microphone boom.

The headset 2 comprises a first beamformer 16 configured for providing a voice signal 18. The voice signal 18 is based on a first input signal 20 from the first input transducer 10 and the second input signal 22 from the second input transducer 12. Optionally, the voice signal 18 may also be based on the third input signal 24 from the third input transducer 14. The first beamformer 16 is configured to optimize the voice-to-background noise ratio.

The headset 2 comprises a second beamformer 26 configured for providing a pop-noise signal 28. The pop-noise signal 28 is based on the first input signal 20 from the first input transducer 10, the second input signal 22 from the second input transducer 12, and the third input signal 24 from the third input transducer 14. The second beamformer 26 is adaptively configured to cancel voice and background noise while not cancelling pop-noise.

The headset 2 comprises a comparator 30 configured to repeatedly compare the pop-noise signal 28 to the voice signal 18 within each of multiple frequency bands to determine time periods and frequency bands having pop-noise. In the determined time periods and frequency bands having pop-noise, the pop-noise, in an output signal 32 configured to be transmitted to the far-end device, is reduced.

The pop-noise in the output signal 32 may be reduced by replacing the voice signal, in the determined time periods and frequency bands having pop-noise, with the third input signal 24 from the third input transducer 14.

Alternatively and/or additionally, the pop-noise in the output signal 32 may be reduced by replacing or suppressing the voice signal, in the determined time periods and frequency bands having pop-noise, with a comfort signal 36.

The pop-noise reduced output signal 32 may also be transmitted to a general noise suppression unit 38 for general noise suppression before transmission to the far end device.

The first input signal 20 from the first input transducer 10, the second input signal 22 from the second input transducer 12, and the third input signal 24 from the third input transducer 14 may be equalized in an equalizer 34 before being transmitted to the first and second beamformer.

Figure 3:
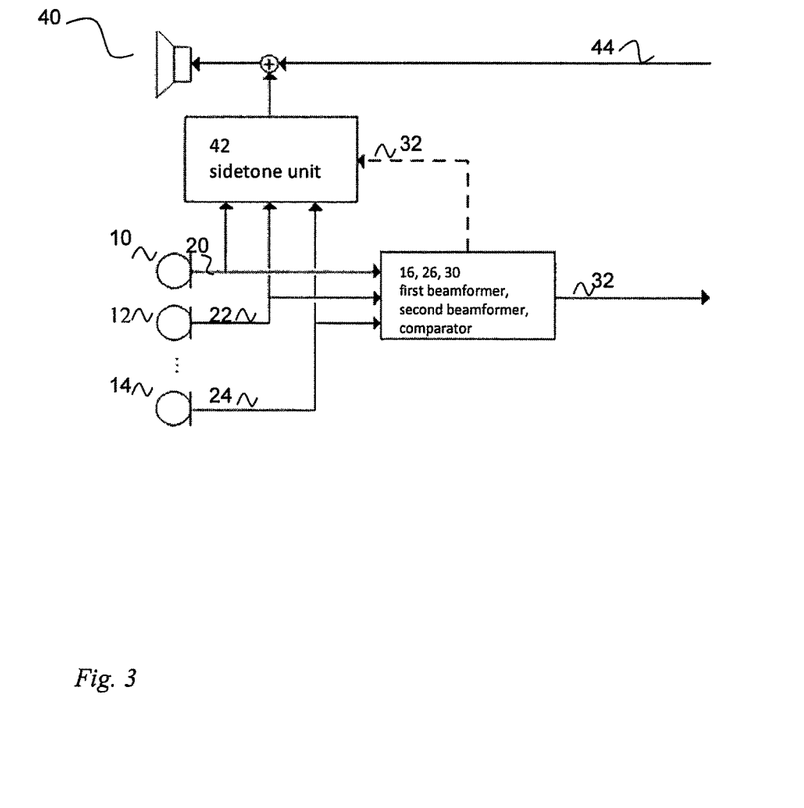
FIG. 3 schematically illustrates an example of a headset for reducing pop-noise in voice communication between a user and a far-end device, and at the same time providing sidetone.

FIG. 3 schematically illustrates an example of a headset 2 for reducing pop-noise in voice communication between a user and a far-end device, and at the same time providing sidetone.

The headset 2 is configured to be worn by the user. The headset 2 comprises a microphone boom (not shown) having a first end and a second end. The first end is configured to point towards the mouth of the user, when the user is wearing the headset.

The headset 2 comprises a first electro-acoustic input transducer 10, a second electro-acoustic input transducer 12 and a third electro-acoustic input transducer 14 for reception of audio input signals.

The first 10, second 12 and third 14 electro-acoustic input transducer are provided in the microphone boom.

The headset 2 comprises a first beamformer 16 configured for providing a voice signal. The voice signal is based on a first input signal 20 from the first input transducer 10. Optionally, the voice signal may also be based on the second input signal 22 from the second input transducer 12 and the third input signal 24 from the third input transducer 14. The first beamformer 16 is configured to optimize the voice-to-background noise ratio.

The headset 2 comprises a second beamformer 26 configured for providing a pop-noise signal. The pop-noise signal is based on the first input signal 20 from the first input transducer 10, the second input signal 22 from the second input transducer 12, and the third input signal 24 from the third input transducer 14. The second beamformer 26 is adaptively configured to cancel voice and background noise while not cancelling pop-noise.

The headset 2 comprises a comparator 30 configured to repeatedly compare the pop-noise signal to the voice signal within each of multiple frequency bands to determine time periods and frequency bands having pop-noise. In the determined time periods and frequency bands having pop-noise, the pop-noise, in an output signal 32 configured to be transmitted to the far-end device, is reduced.

The headset 2 comprises an output transducer 40 for reproduction of audio signals. The output signal 32 is transmitted to the output transducer 40 via a sidetone unit 42 thereby applying the reduced pop noise output signal 32 to the user of the headset 2. The output transducer 40 may be a speaker, a receiver etc. Transmitting the pop-noise reduced output signal 32 to the output transducer 40 of the headset 2 provides that the user of the headset can hear the same output signal 32 as is being outputted to the far-end device. This is called sidetone.

The output transducer 40 also receives the far end device audio signal 44.

Figure 4A:
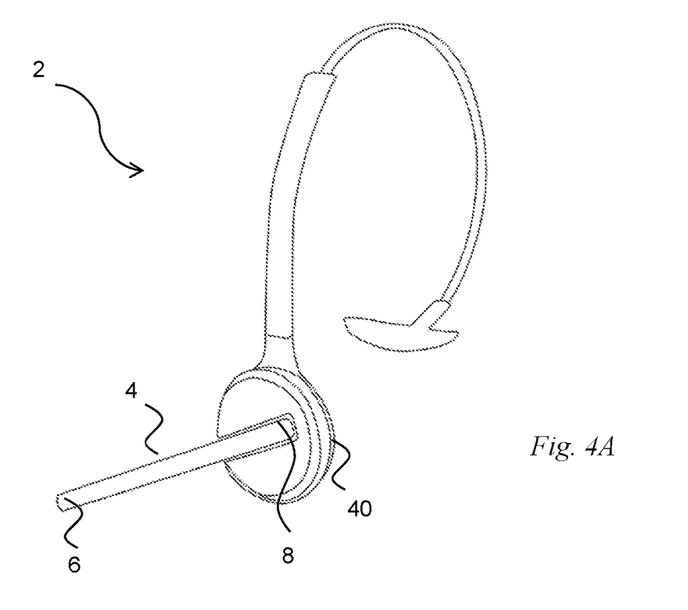
FIGS. 4A-4B schematically illustrate an example of a headset for reducing pop-noise in voice communication between a user and a far-end device.
Figure 4B:
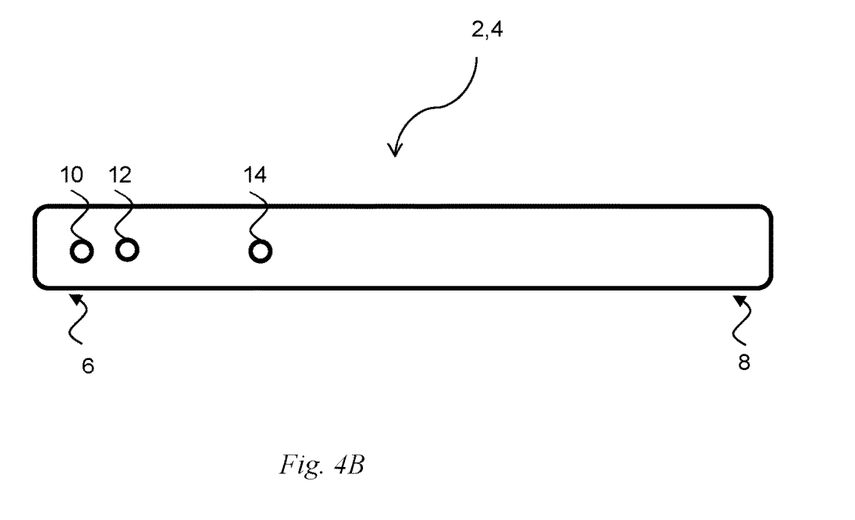

FIGS. 4A-4B schematically illustrate an example of a headset 2 for reducing pop-noise in voice communication between a user and a far-end device. The headset 2 is configured to be worn by the user.

FIG. 4A shows that the headset 2 comprises a microphone boom 4 having a first end 6 and a second end 8. The first end 6 is configured to point towards the mouth of the user, when the user is wearing the headset 2.

FIG. 4B shows that the headset 2 comprises a first electro-acoustic input transducer 10, a second electro-acoustic input transducer 12 and a third electro-acoustic input transducer 14 for reception of audio input signals.

The first 10, second 12 and third 14 electro-acoustic input transducer are provided in the microphone boom 4. The first 10, second 12 and third 14 electro-acoustic input transducer may be provided in an end-fire configuration.

Figure 5:
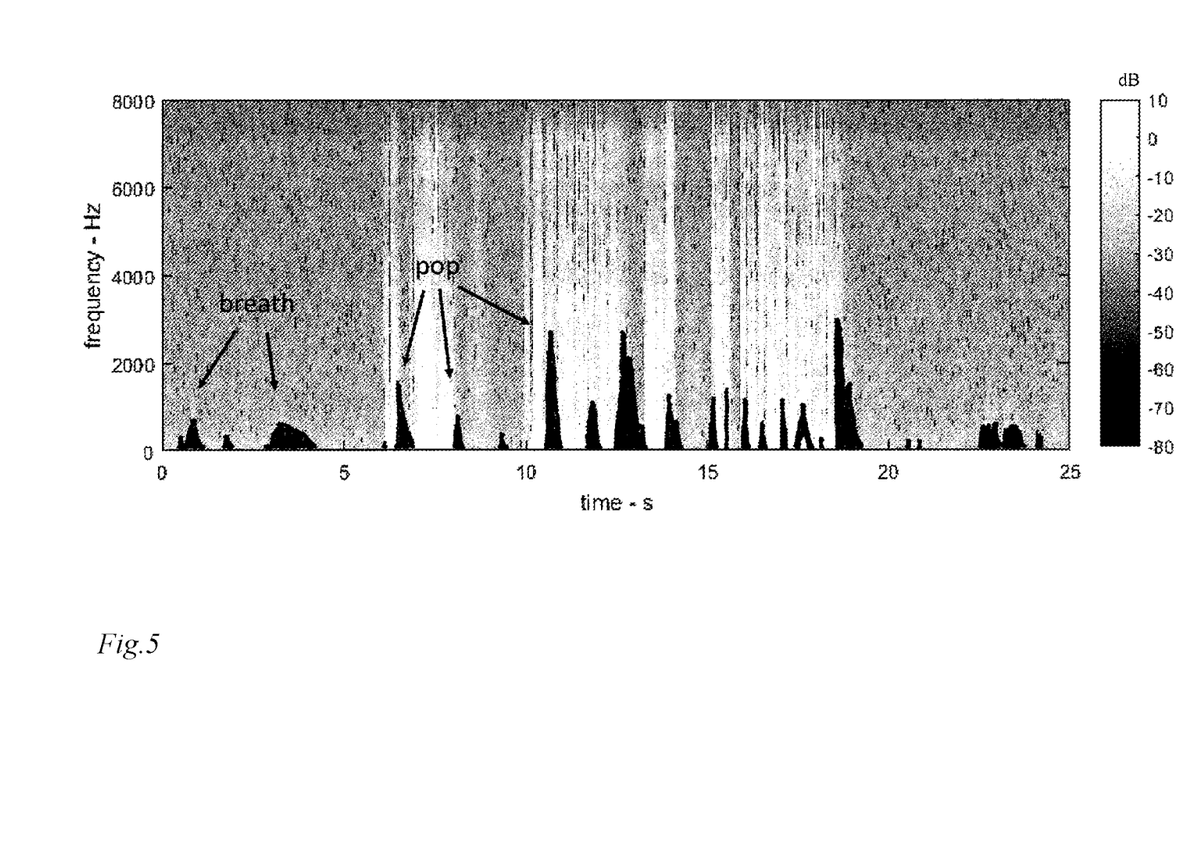
FIG. 5 schematically illustrates an example of a time, frequency graph showing pop-noise in the speech of a user.

FIG. 5 schematically illustrates an example of speech spectrogram overlaid with a detected pop noise pattern. The speech spectrogram is a time, frequency graph showing pop-noise in the speech of a user.

The frequency, measured in Hz, is shown on the y-axis as a function of time, measured in seconds, on the x-axis. On the graph pop or pop noise in the user speech is indicated by arrows. Breath of the user is also indicated.

Some examples of headsets and methods of manufacture are set out as follows.

There is disclosed a headset for reducing pop-noise in voice communication between a user and a far-end device, the headset is configured to be worn by the user, the headset having any or all of the following elements:

a microphone boom having a first end and a second end, where the first end is configured to point towards the mouth of the user, when the user is wearing the headset;

a first, a second and a third electro-acoustic input transducer for reception of audio signals, where the first, second and third electro-acoustic input transducers are provided in the microphone boom;

a first beamformer configured for providing a voice signal the voice signal is based on a first input signal from the first input transducer, where the first beamformer is configured to optimize the voice-to-background noise ratio;

a second beamformer configured for providing a pop-noise signal, the pop-noise signal is based on the first input signal from the first input transducer, the second input signal from the second input transducer and a third input signal from the third input transducer, where the second beamformer is adaptively configured to cancel voice and background noise while not cancelling pop-noise;

a comparator configured to repeatedly compare the pop-noise signal to the voice signal within each of multiple frequency bands to determine time periods and frequency bands having pop-noise;

wherein in the determined time periods and frequency bands having pop-noise, the pop-noise in an output signal configured to be transmitted to the far-end device is reduced.

Also disclosed is a headset wherein pop-noise is wind turbulence caused by airflow from at least the mouth of the user wearing the headset.

Also disclosed is a headset wherein the first input transducer and the second input transducer are arranged on the microphone boom with a shorter distance from the first end than the distance between the first end and the third input transducer.

Also disclosed is a headset wherein reducing the pop-noise in the output signal comprises replacing the voice signal with the third input signal from the third input transducer in time periods and frequency bands having pop-noise.

Also disclosed is a headset wherein reducing the pop-noise in the output signal comprises mixing the voice signal, in time periods and frequency bands having pop-noise, with a comfort signal and/or with the third input signal.

Also disclosed is a headset wherein reducing the pop-noise in the output signal comprises suppressing, such as removing the voice signal in time periods and frequency bands having pop-noise.

Also disclosed is a headset wherein first beamformer is adapted to optimize the voice-to-background noise ratio by using a Minimum Variance Distortionless Response (MVDR) computation or a Generalised Sidelobe Canceller (GSC) computation.

Also disclosed is a headset wherein the second beamformer adaptively cancels voice and background noise while not cancelling pop-noise by cancelling the parts of the input signals which are correlated and keeping the parts of the input signals which are uncorrelated Also disclosed is a headset wherein the first input transducer and the second input transducer are arranged to provide that the first input signal and the second input signal are more correlated than each of the first input signal and second input signal are correlated to the third input signal.

Also disclosed is a headset wherein the headset comprises a fourth input transducer.

Also disclosed is a headset wherein the voice signal provided by the first beamformer is further based on the second input signal from the second input transducer, and/or the third input signal from the third input transducer and/or the fourth input signal from the fourth input transducer.

Also disclosed is a headset wherein the headset comprises an output transducer for reproduction of audio signals; and wherein the output signal is transmitted to the output transducer thereby applying the reduced pop noise output signal to the user of the headset.

Also disclosed is a headset wherein the first, second and third electro-acoustic input transducer are provided in the microphone boom in an end-fire configuration.

Also disclosed is a headset wherein the microphone boom is longer than 5 cm, such as longer than 6 cm, such as longer than 7 cm, such as longer than 8 cm, such as longer than 10 cm, such as longer than 12 cm, such as longer than 14 cm.

Also disclosed is a headset wherein is a method in a headset for reducing pop-noise in voice communication between a user wearing the headset and a far-end device, the headset comprises:
- a microphone boom having a first end and a second end, where the first end is configured to point towards the mouth of the user, when the user is wearing the headset;
- a first, a second and a third electro-acoustic input transducer for reception of audio signals, where the first, second and third electro-acoustic input transducer are provided in the microphone boom;

the method comprises any or all of the following steps in any order:
- receiving a first audio signal in the first electro-acoustic input transducer, a second audio signal in the second electro-acoustic input transducer and a third audio signal in the third electro-acoustic input transducer;
- providing a voice signal in a first beamformer, the voice signal is based on the first input signal from the first input transducer, where the first beamformer is configured to optimize the voice-to-background noise ratio;
- providing a pop-noise signal in a second beamformer, the pop-noise signal is based on the first input signal from the first input transducer, the second input signal from the second input transducer and the third input signal from the third input transducer, where the second beamformer is adaptively configured to cancel voice and background noise while not cancelling pop-noise;
- repeatedly comparing, in a comparator, the pop-noise signal to the voice signal within each of multiple frequency bands to determine time periods and frequency bands having pop-noise;
- reducing the pop-noise in an output signal configured to be transmitted to the far-end device in the determined time periods and frequency bands having pop-noise.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES 2 headset
4 microphone boom
6 first end of microphone boom
8 second end of microphone boom
10 first input transducer
12 second input transducer
14 third input transducer
16 first beamformer
18 voice signal
20 first input signal
22 second input signal
24 third input signal
26 second beamformer
28 pop-noise signal
30 comparator
32 output signal
34 equalizer
36 comfort signal
38 noise suppression unit
40 output transducer
42 sidetone unit
44 audio signal from the far end device

The invention claimed is:

1. A headset for reducing pop-noise in voice communication between a user and a far-end device, the headset is configured to be worn by the user, the headset comprises:
- a microphone boom having a first end and a second end, where the first end is configured to point towards the mouth of the user, when the user is wearing the headset;
- a first, a second and a third electro-acoustic input transducer for reception of audio signals, where the first, second and third electro-acoustic input transducers are provided in the microphone boom, such that the first electro-acoustic input transducer is closest to the user's mouth and the third electro-acoustic input transducer is further away from the user's mouth, when the user is wearing the headset;
- a first beamformer configured for providing a voice signal, the voice signal is based on at least a first input signal from the first input transducer, where the first beamformer is configured to optimize the voice-to-background noise ratio;
- a second beamformer configured for providing a pop-noise signal, the pop-noise signal is based on the first input signal from the first input transducer, a second input signal from the second input transducer and a third input signal from the third input transducer, where the second beamformer is adaptively configured to cancel voice and background noise while not cancelling pop-noise;

a comparator configured to repeatedly compare the pop-noise signal to the voice signal within each of multiple frequency bands to determine time periods and frequency bands having pop-noise;

wherein in the determined time periods and frequency bands having pop-noise, the pop-noise in an output signal configured to be transmitted to the far-end device is reduced by replacing or mixing the voice signal with the third input signal.

2. A headset according to claim 1, wherein pop-noise is wind turbulence caused by airflow from at least the mouth of the user wearing the headset.

3. A headset according to claim 1, wherein the first input transducer and the second input transducer are arranged on the microphone boom with a shorter distance from the first end than the distance between the first end and the third input transducer.

4. A headset according to claim 1, wherein reducing the pop-noise in the output signal comprises replacing the voice signal with the third input signal from the third input transducer in time periods and frequency bands having pop-noise.

5. A headset according to claim 1, wherein reducing the pop-noise in the output signal comprises mixing the voice signal, in time periods and frequency bands having pop-noise, with a comfort signal and/or with the third input signal.

6. A headset according to claim 1, wherein reducing the pop-noise in the output signal comprises suppressing, by removing the voice signal in time periods and frequency bands having pop-noise.

7. A headset according to claim 1, wherein the first beamformer is adapted to optimize the voice-to-background noise ratio by using a Minimum Variance Distortionless Response (MVDR) computation or a Generalised Sidelobe Canceller (GSC) computation.

8. A headset according to claim 1, wherein the second beamformer adaptively cancels voice and background noise while not cancelling pop-noise by cancelling the parts of the input signals which are correlated and keeping the parts of the input signals which are uncorrelated.

9. A headset according to claim 1, wherein the first input transducer and the second input transducer are arranged to provide that the first input signal and the second input signal are more correlated than each of the first input signal and second input signal are correlated to the third input signal.

10. A headset according to claim 1, wherein the headset comprises a fourth input transducer.

11. A headset according to claim 1, wherein the voice signal provided by the first beamformer is further based on the second input signal from the second input transducer, and/or the third input signal from the third input transducer and/or the fourth input signal from the fourth input transducer.

12. A headset according to claim 1, wherein the headset comprises an output transducer for reproduction of audio signals; and wherein the output signal is transmitted to the output transducer thereby applying the reduced pop noise output signal to the user of the headset.

13. A headset according to claim 1, wherein the first, second and third electro-acoustic input transducer are provided in the microphone boom in an end-fire configuration.

14. A headset according to claim 1, wherein the microphone boom is longer than 5 cm.

15. A method in a headset for reducing pop-noise in voice communication between a user wearing the headset and a far-end device, the headset comprises:

a microphone boom having a first end and a second end, where the first end is configured to point towards the mouth of the user, when the user is wearing the headset;

a first, a second and a third electro-acoustic input transducer for reception of audio signals, where the first, second and third electro-acoustic input transducer are provided in the microphone boom, such that the first electro-acoustic input transducer is closest to the user's mouth and the third electro-acoustic input transducer is further away from the user's mouth, when the user is wearing the headset;

the method comprises:

receiving a first audio signal in the first electro-acoustic input transducer, a second audio signal in the second electro-acoustic input transducer and a third audio signal in the third electro-acoustic input transducer;

providing a voice signal in a first beamformer, the voice signal is based on at least the first input signal from the first input transducer, where the first beamformer is configured to optimize the voice-to-background noise ratio;

providing a pop-noise signal in a second beamformer, the pop-noise signal is based on the first input signal from the first input transducer, the second input signal from the second input transducer and the third input signal from the third input transducer, where the second beamformer is adaptively configured to cancel voice and background noise while not cancelling pop-noise;

repeatedly comparing, in a comparator, the pop-noise signal to the voice signal within each of multiple frequency bands to determine time periods and frequency bands having pop-noise;

reducing the pop-noise in an output signal configured to be transmitted to the far-end device in the determined time periods and frequency bands having pop-noise, by replacing or mixing the voice signal with the third input signal.

* * * * *